United States Patent [19] [11] Patent Number: 4,667,156
Machino et al. [45] Date of Patent: May 19, 1987

[54] VEHICLE WHEEL BEARING MOUNTED PULSER

[75] Inventors: Takami Machino; Akira Kikuchi, both of Fujisawa, Japan

[73] Assignee: Nippon Seiko Kabushiki Kaisha, Tokyo, Japan

[21] Appl. No.: 775,439

[22] Filed: Sep. 12, 1985

[30] Foreign Application Priority Data

Sep. 13, 1984 [JP] Japan ............................ 59-137931[U]

[51] Int. Cl.⁴ .......................... G01D 3/48; G01D 1/00
[52] U.S. Cl. .................................... 324/173; 324/179; 384/535; 73/494
[58] Field of Search .................. 384/535, 581; 73/494; 324/173, 174, 179

[56] References Cited

U.S. PATENT DOCUMENTS 3,061,386 10/1962 Dix ..................................... 384/535
4,161,120 7/1979 Cloarec ............................. 324/173
4,259,637 3/1981 Bloomfield .......................... 324/173

FOREIGN PATENT DOCUMENTS 431828 7/1926 Fed. Rep. of Germany ...... 384/535
345204 4/1960 Switzerland ........................ 384/535

Primary Examiner—Reinhard J. Eisenzopf
Assistant Examiner—Jose M. Solis
Attorney, Agent, or Firm—Basile Weintraub Hanlon

[57] ABSTRACT

Wheel bearing pulser combinations of the type where an annular pulser is force fitted onto the outer surface of a wheel bearing are disclosed in which the pulser is constructed to accommodate resiliently resisted radial expansion of its central opening as required by the force fitting of the pulser onto the bearing to permit increased dimensional tolerances of the bearing while avoiding an undue radial compression of the outer race of the bearing from the force fit.

4 Claims, 9 Drawing Figures

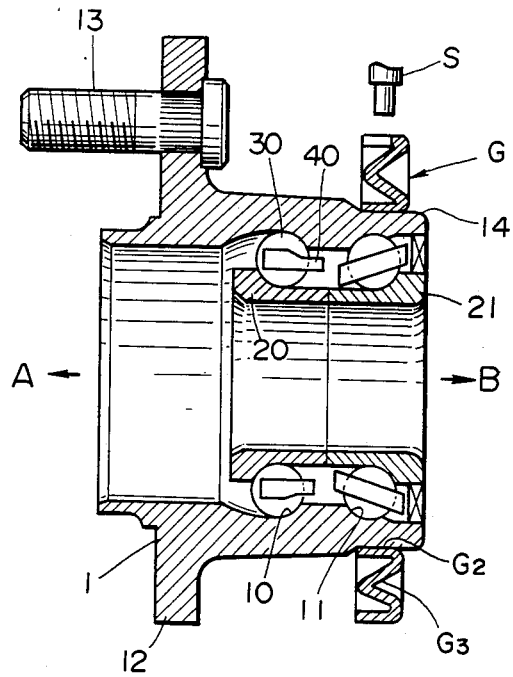
FIG. 1
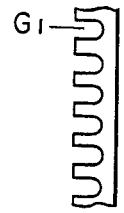
FIG. 2
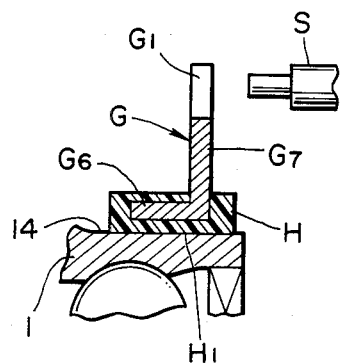
FIG. 3
FIG. 4

VEHICLE WHEEL BEARING MOUNTED PULSER

BACKGROUND OF THE INVENTION

Field of the Invention

The present invention is particularly concerned with the construction of a so-called pulser employed in anti-lock controls for vehicle braking systems.

When the brakes of a vehicle travelling on a wet or icy road are applied, extreme care must be taken to prevent locking of the wheels with the consequent loss of control of the vehicle. Computerized anti-lock braking control systems have been developed which, by monitoring the rate of rotation of the vehicle wheels will control the action of the vehicle brakes to apply the maximum braking action short of wheel locking even if the driver over brakes.

A typical wheel rate of rotation monitoring device employed in such systems takes the form of a pulser having the general shape of an external gear which is mounted to rotate with the wheel. A sensor is mounted on the vehicle frame adjacent the periphery of the pulser and the teeth of the gear-like pulser rotating past the sensor cause the sensor to generate a pulsating electric signal whose frequency is proportional to the rate of rotation of the wheel. This signal is fed into a computerized control system which, upon application of the brakes, will override the controlling action of the brake pedal to prevent locking. Several types of such systems are commercially available.

The gear-like pulser employed in such systems is conventional coupled to the vehicle wheel by press-fitting the pulser onto the outer race of a flanged wheel bearing, the outer race in turn being fixedly attached to the brake disk or brake drum of the wheel by means of bolts passing through the flange on the outer race. This mounting arrangement presents several problems, and the present invention is directed to avoiding or minimizing the problems outlined below.

The outer race of the flanged wheel bearings referred to above is conventionally constructed as a forged part which requires heat treatment. Because the pulser is to be mounted upon the outer race by a press or force fit, it is necessary that the annular surface of the outer race upon which the pulser is to be fitted be finish machined to precise dimensional tolerances. Because heat treatment causes dimensional changes in the part, final machining cannot be performed until after the heat treating process is completed, and machining of the hardened heat treated part is not only time consuming, but hard on the cutting tool.

Further, the force fit of the pulser upon the outer race exerts a radially directed compressive force on the outer race which can, and frequently does, cause premature failure of the bearing.

The present invention is especially directed to a pulser construction which dispenses with the need for precise dimensional finishing of the outer race and minimizes the radial compressive forces exerted on the outer race by the assemble pulser while providing a firmly fixed mounting of the pulser upon the outer race.

SUMMARY OF THE INVENTION

In accordance with the present invention, a pulser may be constructed in any of several forms, all of which possess the common feature of a central outer race receiving opening defined by an element or member which possesses resiliency to radially directed forces encountered when the pulser is installed upon the outer race of the bearing.

Details of specific forms of pulsers embodying the present invention will become apparent by reference to the following specification and to the drawings.

IN THE DRAWINGS

FIG. 1 is a cross-sectional view of a first embodiment of the present invention;

FIG. 2 is a partial detailed development view of the outer periphery of the pulser of FIG. 1;

FIG. 3 is a partial cross-sectional view of a second embodiment of the invention;

FIG. 4 is a partial detailed view of the periphery of the pulser of FIG. 3;

DESCRIPTION OF PRIOR ART

Figure 8:
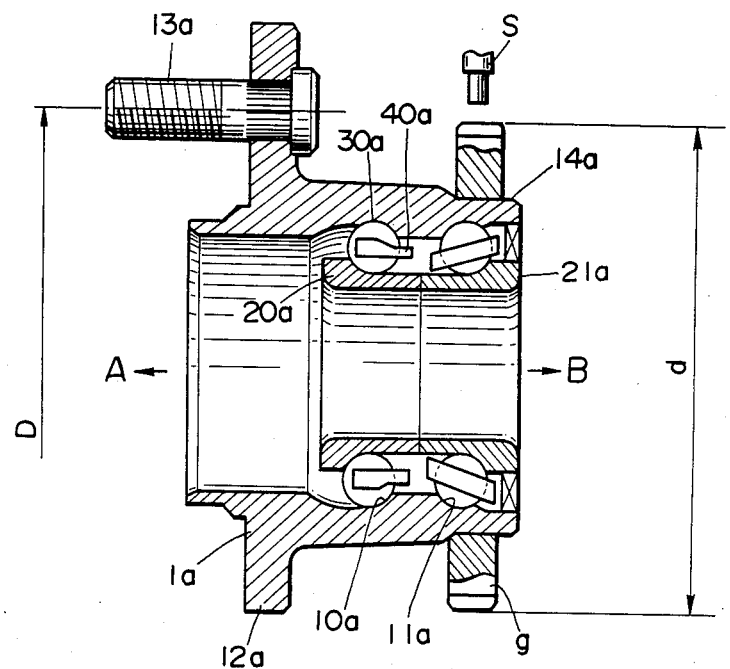
FIG. 8 is a cross-sectional view, similar to FIG. 1, but showing a conventional prior art assembly.

In FIG. 8 there is disclosed a bearing-pulser assembly which presents the problems discussed briefly above in connection with the background of the present invention.

Referring to FIG. 8, there is shown a double row flanged bearing having an outer race 1a formed with a radially outwardly projecting flange 12a by means of which outer race 1a may be fixedly mounted to a brake disk or brake drum (not shown) as by bolts 13a. Sets of balls such as 30a are received in race ways 10a, 11a appropriately formed in the interior of outer race 1a and mainiained in the race ways by inner races 20a, 21a, the balls being positioned relative to each other as by retainers 40a.

A gear-like pulser g is mounted on a machined surface 14a of outer race 1a with an interference or force fit so that pulser g is effectively, fixedly mounted upon outer race 1a. A sensor S is mounted upon a fixed portion of the vehicle frame (not shown) closely adjacent the periphery of pulser g and rotation of the teeth of the gear-shaped pulser G past sensor S causes the sensor to generate a pulsating electric signal of a frequency proportional to the speed of the pulser.

This pulsating signal is fed into a computerized control system (not shown) which will control the braking system of a vehicle to prevent locking of the vehicle wheels in the face of an excessive brake application. Such antilock braking systems are well known in the art and commercially available. Such systems do not, per se, perform any part of the present invention, but are referred to here in that the present invention is concerned with the construction of a pulser employed as a component of such a control system.

As previously described, in order to achieve the desired force fit between pulser g and the surface 14a, it is necessary that the surface 14a be machined to a precisely regulated dimension. As noted above, if outer race 1a is to be heat treated, this machining cannot be performed until after the heat treating is completed with the consequent increase in difficulty in machining of the hardened surface. Further, it is believed apparent from inspection of FIG. 8 that force fitting of the pulser g onto outer race 1a will exert a radially compressive force inwardly against surface 14a and effectively compress the right-hand end of outer race 1a forceably against the right-hand set of balls of the bearing, thus increasing wear which can lead to premature failure of the bearing. Increasing the thickness of outer race 1a in this last region will minimize this latter problem, however, it will also increase the outer dimensions and weight of outer race 1a.

It is also apparent, noting the outer diameter d of pulser g in FIG. 8 and its relationship to the bolt circle D of bolts 13a that installation of pulser G would be most conveniently performed only after the assembled bearing has been bolted by bolts 13a to the brake disk or drum.

The present invention is concerned with eliminating or minimizing the foregoing problems presented by the prior art arrangement of FIG. 8.

A first embodiment of the present invention is shown in FIGS. 1 and 2 and includes a bearing in the form of the bearing shown in FIG. 8 which includes an outer race 1 formed with a radially projecting flange 12 and a cylindrical pulser mounting surface 14. Race ways 10 and 11, balls 30 and a two-part inner race 20, 21 are also present.

The pulser G of the embodiment of FIGS. 1 and 2 takes the form of an annular member press-formed from a suitable steel blank into a generally M shaped transverse cross-section with an axially extending radially inner web G2 and uniformly-spaced recesses G1 formed in its radially outer web. The central opening defined by the radially inner web G2 is dimensioned such that the pulser G may be mounted on surface 14 of the outer race 1 of the bearing with a force fit.

However, unlike the prior art arrangement, precise dimensional tolerances of the opening defined by web G2 and the seating surface 14 of the bearing are not required because the cross-sectional configuration of the pulser G of FIGS. 1 and 2 provides a certain amount of resiliency radially of the pulser. Thus, as the pulser G is seated on the bearing, some resiliently resisted radial expansion of the central opening defined by web G2, as may be required by the dimensions of the particular parts being assembled, can occur. This capability of radial expansion eliminates the necessity of precisely machining the surface 14 of outer race 1 of the bearing and, by suitable selecting the thickness of the metal from which pulser G is formed, a force fit adequate to maintain the desired assembly may be achieved without applying an undue amount of radial compressive force to outer race 1.

A second embodiment of the invention is shown in FIGS. 3 and 4. In this second embodiment, the pulser G is press formed from a steel blank into a generally L-shaped transverse cross-section having a generally cylindrical inner annular web G6 and a radially projecting flange G7 formed with uniformly spaced recesses G1 extending radially into flange G7 from its outer periphery. The annular web G6 is enclosed by a resilient member H formed of rubber or a suitable plastic material which is directly molded upon or otherwise fixedly bonded to web G6. That portion of member H located at the radially inner side of web G6 at H1 is formed with a thickness related to the resilient properties of the resilient material employed to accommodate a desired degree of radial expansion of the opening through the pulser to provide an adequate force fit of the composite pulser G of FIGS. 3 and 4 onto the surface 14 of the bearing in the face of a dimensional tolerance of surface 14 large enough to eliminate the necessity of finish machining of surface 14 after heat treatment.

In the FIGS. 3 and 4 embodiments, the radial orientation of the gear-like periphery of the pulser finds the sensor S located to one side of the pulser.

Figure 5:
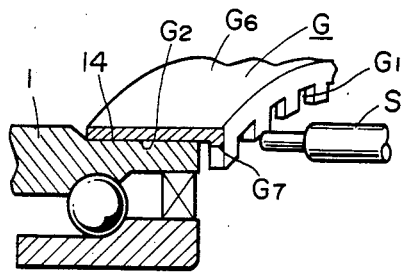
FIG. 5 is a perspective view, partially in section, of a third embodiment of the invention.

In a third embodiment of the invention shown in FIG. 5, the pulser G is formed with an axially extending annular web G6 with a radially, inwardly projecting flange G7 at one axial end formed with uniformly spaced recesses G1. The annular web G6 is quite thin in its radial extent and by the use of a relatively resilient steel, radial expansion of the pulser as required during the force fitting of the pulser upon outer race 1 may be achieved.

Figures 6A, 6B:
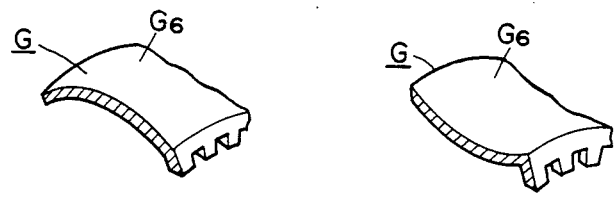
FIGS. 6A and 6B are respectively respective views, partially in section, of two variant forms of the embodiment of FIG. 5.

FIGS. 6A and 6B show two variant forms for imparting some additional resiliency to the annular web G6 of the FIG. 5 embodiment, namely, the initial formation of the web G6 with an inwardly concave (FIG. 6A) or convex (FIG. 6B) transverse cross-sectional configuration.

Figure 7:
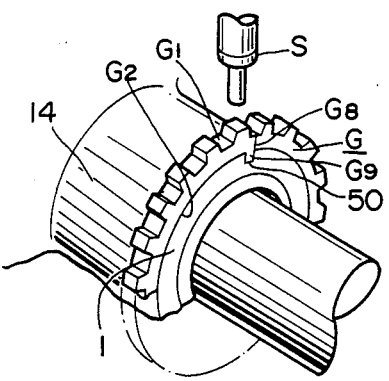
FIG. 7 is a perspective view, with certain parts broken away, of a fourth embodiment of the present invention.

Still another embodiment of the present invention is disclosed in FIG. 7 of the drawings. In the embodiment of FIG. 7, the pulser G is formed in the configuration of an external gear from a highly resilient steel. Uniformly spaced recesses G1 in the outer periphery of the pulser form the gear-like teeth and the relatively large central opening G2 is initially dimensioned to provide the desired force fit of the pulser onto the surface 14 of the outer race of the bearing 1.

In the embodiment of FIG. 7, an axial slit G8 is provided to accommodate a reasonable amount of circumferential expansion of the pulser as may be required by radial expansion of the central opening G2 during the force fitting of the pulser onto the bearing. A radial protrusion G9 projecting inwardly from the pulser is seated in a complimentary slot 50 cut in the bearing to provide a positive rotative coupling between the pulser and bearing. Alternatively, this rotative coupling might be provided by some other suitable means, such as a screw.

All of the various embodiments of the invention described above have the common feature of providing a reasonable degree of radial resilience to the pulser which will accommodate a reasonable amount of expansion of its central opening as the pulser is force fitted onto the bearing. This resilience not only eliminates the necessity of close dimensional tolerances between the fitted parts, but also achieves an adequate fitting force without applying unduly high compressive forces to the outer ring of the bearing upon which the pulser is force fitted.

While various embodiments of the invention have been described in detail, it will be apparent to those skilled in the art that the disclosed embodiments may be modified. Therefore, the foregoing description is to be considered exemplary, rather than limiting, and the true scope of the invention is defined in the following claims.

We claim:

1. In a wheel bearing pulser combination wherein said bearing includes an outer race formed with a generally cylindrical pulser seating external surface and wherein an annular pulser is formed with a central opening therethrough dimensioned to receive said seating surface in a force fitted relationship to mount said pulser on said bearing;

the improvement wherein said pulser comprises a one piece annular member including an axially extending annular radially inner web defining said central opening, an annular axially extending radially outer web, and web means integrally coupling said inner and outer webs for resiliently resisted radial movement relative to each other, wherein said pulser accommodates resiliently resisted radial expansion of the central opening.

2. The invention defined in claim 1 wherein said pulser further comprises means defining an axially extending slit.

3. The invention defined in claim 2 wherein said annular member comprises a generally axially extending annular web of relatively thin resilient metal.

4. The invention defined in claim 3 wherein said annular web is of an arcuately curved axial cross-sectional configuration.

* * * * *